US011286795B2

(12) United States Patent
Kray

(10) Patent No.: US 11,286,795 B2
(45) Date of Patent: Mar. 29, 2022

(54) MOUNT FOR AN AIRFOIL

(71) Applicant: General Electric Company, Schenectady, NY (US)

(72) Inventor: Nicholas Joseph Kray, Mason, OH (US)

(73) Assignee: General Electric Company, Schenectady, NY (US)

( * ) Notice: Subject to any disclaimer, the term of this patent is extended or adjusted under 35 U.S.C. 154(b) by 72 days.

(21) Appl. No.: 16/897,874

(22) Filed: Jun. 10, 2020

(65) Prior Publication Data

US 2021/0108518 A1 Apr. 15, 2021

Related U.S. Application Data

(60) Provisional application No. 62/915,364, filed on Oct. 15, 2019.

(51) Int. Cl.
*F01D 5/30* (2006.01)
*F02C 7/36* (2006.01)
(Continued)

(52) U.S. Cl.
CPC ............... *F01D 5/30* (2013.01); *B32B 7/022* (2019.01); *B64C 1/062* (2013.01); *B64C 1/12* (2013.01); *B64C 1/38* (2013.01); *B64D 7/00* (2013.01); *B64D 27/12* (2013.01); *F01D 5/12* (2013.01); *F01D 5/187* (2013.01); *F01D 5/3007* (2013.01); *F01D 7/00* (2013.01); *F01D 9/02* (2013.01); *F01D 9/041* (2013.01); *F01D 15/10* (2013.01); *F01D 15/12* (2013.01); *F01D 17/162* (2013.01); *F01D 25/12* (2013.01); *F02C 7/264* (2013.01);
(Continued)

(58) Field of Classification Search
CPC ......... F01D 5/30; F01D 5/3007; B64C 11/04; B64C 11/06; B64C 11/20; B64C 21/02; B64C 21/10; F05D 2260/221; F04D 29/34
See application file for complete search history.

(56) References Cited

U.S. PATENT DOCUMENTS 2,445,154 A * 7/1948 Reed ..................... F01D 5/30
416/221
4,534,526 A 8/1985 Metzger et al.
(Continued)

FOREIGN PATENT DOCUMENTS

GB 798613 A * 7/1958 ............ B23P 15/006

OTHER PUBLICATIONS

Carney et al., Weight Assessment for Fuselage Shielding on Aircraft With Open-Rotor Engines and Composite Blade Loss, NASA/TM-2013-216582, 2013, 33 Pages.
(Continued)

*Primary Examiner* — Eldon T Brockman
(74) *Attorney, Agent, or Firm* — Dority & Manning, P.A.

(57) ABSTRACT

A gas turbine engine is provided. The gas turbine engine defines a radial direction. The engine includes: an airfoil positioned within an airflow and extending between a root end and a tip along the radial direction; and a mount coupled to or formed integrally with the root end of the airfoil for mounting the airfoil to the engine, the mount including an outer surface along the radial direction exposed to the airflow and defining an air-cooling channel extending between an inlet and an outlet, the inlet positioned on the outer surface of the mount.

20 Claims, 5 Drawing Sheets

(51) Int. Cl.

| | | |
|---|---|---|
| F02C 7/32 | (2006.01) | |
| F01D 15/12 | (2006.01) | |
| F01D 15/10 | (2006.01) | |
| F02C 9/00 | (2006.01) | |
| F02C 9/22 | (2006.01) | |
| F02K 1/76 | (2006.01) | |
| F01D 5/12 | (2006.01) | |
| F01D 9/02 | (2006.01) | |
| F01D 5/18 | (2006.01) | |
| F02C 7/264 | (2006.01) | |
| F01D 7/00 | (2006.01) | |
| F01D 9/04 | (2006.01) | |
| F01D 17/16 | (2006.01) | |
| B64C 1/06 | (2006.01) | |
| B64D 27/12 | (2006.01) | |
| F01D 25/12 | (2006.01) | |
| B32B 7/022 | (2019.01) | |
| B64C 1/12 | (2006.01) | |
| B64D 7/00 | (2006.01) | |
| B64C 1/38 | (2006.01) | |
| B64C 1/00 | (2006.01) | |

(52) U.S. Cl.
CPC .............. *F02C 7/32* (2013.01); *F02C 7/36* (2013.01); *F02C 9/00* (2013.01); *F02C 9/22* (2013.01); *F02K 1/76* (2013.01); *B32B 2307/558* (2013.01); *B32B 2307/72* (2013.01); *B32B 2307/732* (2013.01); *B32B 2571/02* (2013.01); *B32B 2605/18* (2013.01); *B64C 2001/0072* (2013.01); *F05D 2220/323* (2013.01); *F05D 2230/60* (2013.01); *F05D 2240/12* (2013.01); *F05D 2240/24* (2013.01); *F05D 2240/60* (2013.01); *F05D 2250/37* (2013.01); *F05D 2260/201* (2013.01); *F05D 2260/30* (2013.01); *F05D 2260/4031* (2013.01); *F05D 2260/70* (2013.01); *F05D 2270/05* (2013.01); *F05D 2270/051* (2013.01); *F05D 2270/121* (2013.01); *F05D 2270/304* (2013.01); *F05D 2270/71* (2013.01); *F05D 2270/81* (2013.01)

(56) References Cited

U.S. PATENT DOCUMENTS

| | | | |
|---|---|---|---|
| 4,917,336 A | | 4/1990 | Jacobs et al. |
| 4,934,825 A | | 6/1990 | Martin |
| 4,976,102 A | | 12/1990 | Taylor |
| 5,148,402 A | | 9/1992 | Magliozzi et al. |
| 5,156,353 A | | 10/1992 | Gliebe et al. |
| 5,190,441 A | | 3/1993 | Murphy et al. |
| 5,197,855 A | | 3/1993 | Magliozzi et al. |
| 5,789,678 A | | 8/1998 | Pla |
| 6,341,747 B1 | | 1/2002 | Schmidt et al. |
| 7,578,132 B2 | | 8/2009 | Webster |
| 8,011,613 B2 | | 9/2011 | Belleville |
| 8,083,482 B2 | | 12/2011 | Serven et al. |
| 8,087,607 B2 | | 1/2012 | Moore et al. |
| 8,186,617 B2 | | 5/2012 | Llamas Sandin |
| 8,196,860 B2 | | 6/2012 | Gall et al. |
| 8,210,798 B2 | * | 7/2012 | Stern .................. F02K 3/072 415/116 |
| 8,220,586 B2 | | 7/2012 | Todorovic |
| 8,240,609 B2 | | 8/2012 | Parazzoli et al. |
| 8,350,398 B2 | | 1/2013 | Butt |
| 8,550,397 B2 | | 10/2013 | Verde Preckler et al. |
| 8,690,106 B1 | | 4/2014 | Reissig |
| 8,967,967 B2 | | 3/2015 | Stretton et al. |
| 9,057,329 B2 | | 6/2015 | Weir et al. |
| 9,102,397 B2 | | 8/2015 | Wood |
| 9,255,583 B2 | * | 2/2016 | Boston ................ F04D 29/321 |
| 9,453,414 B2 | * | 9/2016 | Tajan ................... F01D 5/3007 |
| 9,527,578 B2 | | 12/2016 | Towkan |
| 9,540,094 B2 | | 1/2017 | Negulescu et al. |
| 9,725,155 B2 | | 8/2017 | Miller et al. |
| 9,745,051 B2 | | 8/2017 | Tantot et al. |
| 9,758,254 B2 | | 9/2017 | Moore et al. |
| 9,856,745 B2 | | 1/2018 | Ali |
| 9,890,657 B2 | | 2/2018 | Ali |
| 10,118,710 B2 | | 11/2018 | Derrez et al. |
| 10,131,441 B2 | | 11/2018 | Edwards et al. |
| 10,202,865 B2 | | 2/2019 | Breeze-Stringfellow et al. |
| 10,370,086 B2 | | 8/2019 | Vion et al. |
| 10,378,452 B1 | | 8/2019 | Barmichev et al. |
| 10,399,664 B2 | | 9/2019 | Bowden et al. |
| 10,414,486 B2 | | 9/2019 | Wood et al. |
| 2008/0245925 A1 | | 10/2008 | Udall |
| 2009/0202357 A1 | * | 8/2009 | Stern .................. F02C 6/206 416/97 R |
| 2012/0195739 A1 | | 8/2012 | Kingan |
| 2012/0237359 A1 | * | 9/2012 | Stern .................. F01D 1/26 416/97 R |
| 2012/0257975 A1 | * | 10/2012 | Boston ................ F04D 29/323 416/147 |
| 2013/0115083 A1 | | 5/2013 | Vuillemin |
| 2014/0099205 A1 | * | 4/2014 | Taj ...................... F01D 5/3007 416/95 |
| 2014/0248116 A1 | | 9/2014 | Ali |
| 2015/0291276 A1 | | 10/2015 | Zatorski et al. |
| 2015/0344127 A1 | | 12/2015 | Wood et al. |
| 2016/0010487 A1 | | 1/2016 | Breeze-Stringfellow et al. |
| 2016/0333729 A1 | | 11/2016 | Miller et al. |
| 2016/0333734 A1 | | 11/2016 | Bowden et al. |
| 2016/0368592 A1 | | 12/2016 | Szymandera |
| 2017/0002688 A1 | | 1/2017 | Beutin et al. |
| 2017/0159571 A1 | | 6/2017 | Sidelkovskiy |
| 2017/0167271 A1 | * | 6/2017 | McCaffrey .............. F01D 5/187 |
| 2017/0225773 A1 | | 8/2017 | Wood et al. |
| 2018/0065727 A1 | | 3/2018 | Gruber et al. |
| 2018/0079492 A1 | | 3/2018 | Seidel et al. |
| 2018/0127084 A1 | | 5/2018 | Tajan et al. |
| 2018/0354634 A1 | | 12/2018 | Jodet et al. |

OTHER PUBLICATIONS

Gazzaniga et al., Wind Tunnel Performance Results of Swirl Recovery Vanes as Tested with an Advanced High-Speed Propeller, AIAA-92-3770, 28th Joint Propulsion Conference Exhibit, Nashville TN, Jul. 6-8, 1992, 42 Pages.

Open Rotor Engine and Installation, European Aviation Safety Agency, Notice of Proposed Amendment 2015-22, RMT.0384 (MDM. 092) Dec. 21, 2015., 96 Pages.

* cited by examiner

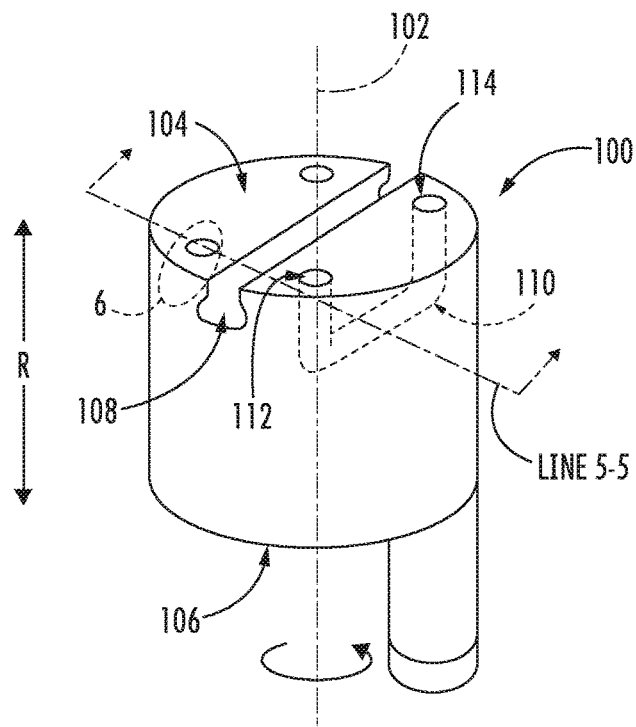
FIG. 4
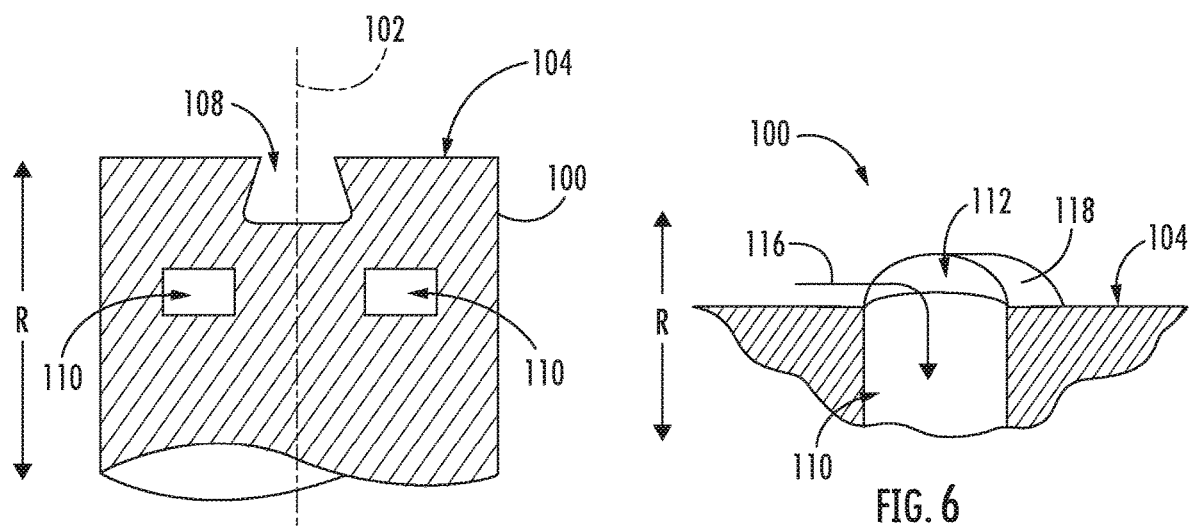
FIG. 5
FIG. 6

MOUNT FOR AN AIRFOIL

CROSS-REFERENCE TO RELATED APPLICATIONS

This application is a non-provisional application claiming the benefit of priority under 35 U.S.C. § 119(e) to U.S. Provisional Application No. 62/915,364, filed Oct. 15, 2019, which is hereby incorporated by reference in its entirety.

FIELD

This application is generally directed to a mount for an airfoil of a gas turbine engine, such as a mount for a rotor blade of a rotor assembly of an open rotor turbomachine engine.

BACKGROUND

A turbofan engine operates on the principle that a central gas turbine core drives a bypass fan, the bypass fan being located at a radial location between a nacelle of the engine and the engine core. In certain aspects, it may be desirable to provide an open rotor propulsion system utilizing a single rotating rotor assembly analogous to a traditional turbofan engine bypass fan which reduces a complexity of the design, yet yields a relatively high level of propulsive efficiency. With such a configuration, the rotating rotor assembly may include rotor blades coupled to a pitch change mechanism for changing a pitch of the rotor blades during operation.

Further, the rotor assembly, as well as a stage of guide vanes downstream of the rotor assembly and blades and vanes within a turbine section and compressor section of the gas turbine core, will be mounted to a mounting structure, such as a disk or a rotor, at an inner end along a radial direction. Certain of these mounting structures may get undesirably hot by virtue of, e.g., operation of the pitch change mechanism or other environmental aspects located inward of the mounting structure along the radial direction. The inventors of the present disclosure have discovered that the high temperature of the mounting structure may have various undesirable effects, and thus that a mounting structure having one or more features for reducing its temperature during operation would be useful.

BRIEF DESCRIPTION

Aspects and advantages of the invention will be set forth in part in the following description, or may be obvious from the description, or may be learned through practice of the invention.

In an aspect of the present disclosure, a gas turbine engine is provided. The gas turbine engine defines a radial direction. The engine includes: an airfoil positioned within an airflow and extending between a root end and a tip along the radial direction; and a mount coupled to or formed integrally with the root end of the airfoil for mounting the airfoil to the engine, the mount including an outer surface along the radial direction exposed to the airflow and defining an air-cooling channel extending between an inlet and an outlet, the inlet positioned on the outer surface of the mount.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 4 is a schematic view of a mount for an airfoil in accordance with an exemplary embodiment of the present disclosure.

FIG. 5 is a cross-sectional view of the mount of FIG. 4 along Line 5-5 in FIG. 4.

FIG. 6 is a close-up view of an inlet to an air cooling channel of the exemplary mount of FIG. 4.

DETAILED DESCRIPTION

Figure 1:
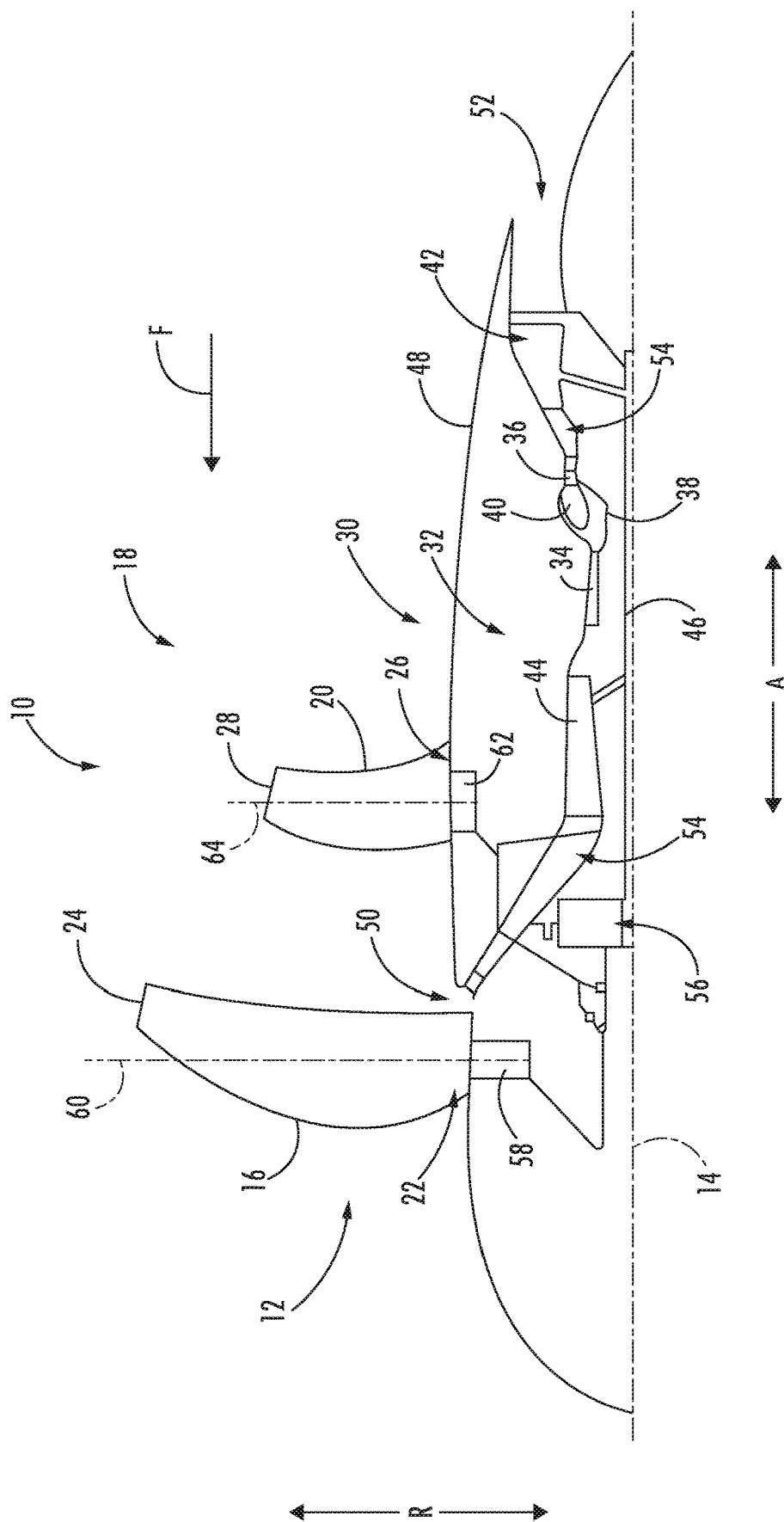
FIG. 1 is a schematic, cross-sectional view of a gas turbine engine in accordance with an exemplary aspect of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The word "exemplary" is used herein to mean "serving as an example, instance, or illustration." Any implementation described herein as "exemplary" is not necessarily to be construed as preferred or advantageous over other implementations.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

In some embodiments, one or more components of the gas turbine engine described hereinbelow may be manufactured or formed using any suitable process, such as an additive manufacturing process, such as a 3-D printing process. The use of such a process may allow such component to be formed integrally, as a single monolithic component, or as any suitable number of sub-components. In particular, the additive manufacturing process may allow such component to be integrally formed and include a variety of features not possible when using prior manufacturing methods. For example, the additive manufacturing methods described herein enable the manufacture of heat exchangers having unique features, configurations, thicknesses, materials, densities, fluid passageways, headers, and mounting structures that may not have been possible or practical using prior manufacturing methods. Some of these features are described herein.

As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral sub-components. Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets, laser jets, and binder jets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

The additive manufacturing processes described herein may be used for forming components using any suitable material. For example, the material may be plastic, metal, concrete, ceramic, polymer, epoxy, photopolymer resin, or any other suitable material that may be in solid, liquid, powder, sheet material, wire, or any other suitable form or combinations thereof. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, and nickel or cobalt based superalloys (e.g., those available under the name Inconel® available from Special Metals Corporation). These materials are examples of materials suitable for use in the additive manufacturing processes described herein, and may be generally referred to as "additive materials."

In addition, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed which have different materials and material properties for meeting the demands of any particular application. In addition, although the components described herein are constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

Notably, in exemplary embodiments, several features of the components described herein were previously not possible due to manufacturing restraints. However, the present inventors have advantageously utilized current advances in additive manufacturing techniques to develop exemplary embodiments of such components generally in accordance with the present disclosure. While the present disclosure is not limited to the use of additive manufacturing to form these components generally, additive manufacturing does provide a variety of manufacturing advantages, including ease of manufacturing, reduced cost, greater accuracy, etc.

In this regard, utilizing additive manufacturing methods, even multi-part components may be formed as a single piece of continuous metal, and may thus include fewer sub-components and/or joints compared to prior designs. The integral formation of these multi-part components through additive manufacturing may advantageously improve the overall assembly process. For example, the integral formation reduces the number of separate parts that must be assembled, thus reducing associated time and overall assembly costs. Additionally, existing issues with, for example, leakage, joint quality between separate parts, and overall performance may advantageously be reduced.

Referring now to the Drawings, FIG. 1 shows an elevational cross-sectional view of an exemplary embodiment of a gas turbine engine as may incorporate one or more inventive aspects of the present disclosure. In particular, the exemplary gas turbine engine of FIG. 1 is a configured as a single unducted rotor engine 10 defining an axial direction A, a radial direction R, and a circumferential direction C (see FIGS. 2 and 3, extending about the axial direction A). As is seen from FIG. 1, engine 10 takes the form of an open rotor propulsion system and has a rotor assembly 12 which includes an array of airfoils arranged around a central longitudinal axis 14 of engine 10, and more particularly includes an array of rotor blades 16 arranged around the central longitudinal axis 14 of engine 10. Moreover, as will be explained in more detail below, the engine 10 additionally includes a non-rotating vane assembly 18 positioned aft of the rotor assembly 12 (i.e., non-rotating with respect to the central axis 14), which includes an array of airfoils also disposed around central axis 14, and more particularly includes an array of vanes 20 disposed around central axis 14. The rotor blades 16 are arranged in typically equally spaced relation around the centerline 14, and each blade has a root 22 and a tip 24 and a span defined therebetween. Similarly, the vanes 20 are also arranged in typically equally spaced relation around the centerline 14, and each has a root 26 and a tip 28 and a span defined therebetween. The rotor assembly 12 further includes a hub 44 located forward of the plurality of rotor blades 16.

Additionally, the engine 10 includes a turbomachine 30 having core (or high speed system) 32 and a low speed system. The core 32 generally includes a high-speed compressor 34, a high speed turbine 36, and a high speed shaft 38 extending therebetween and connecting the high speed compressor 34 and high speed turbine 36. The high speed compressor 34, the high speed turbine 36, and the high speed shaft 38 may collectively be referred to as a high speed spool of the engine. Further, a combustion section 40 is located between the high speed compressor 34 and high speed turbine 36. The combustion section 40 may include one or more configurations for receiving a mixture of fuel and air, and providing a flow of combustion gasses through the high speed turbine 36 for driving the high speed spool.

The low speed system similarly includes a low speed turbine 42, a low speed compressor or booster, 44, and a low speed shaft 46 extending between and connecting the low speed compressor 44 and low speed turbine 42. The low speed compressor 44, the low speed turbine 42, and the low speed shaft 46 may collectively be referred to as a low speed spool of the engine.

Although the engine 10 is depicted with the low speed compressor 44 positioned forward of the high speed compressor 34, in certain embodiments the compressors 34, 44 may be in an interdigitated arrangement. Additionally, or alternatively, although the engine 10 is depicted with the high speed turbine 36 positioned forward of the low speed turbine 42, in certain embodiments the turbines 36, 42 may similarly be in an interdigitated arrangement.

Referring still to FIG. 1, the turbomachine 30 is generally encased in a cowl 48. Moreover, it will be appreciated that the cowl 48 defines at least in part an inlet 50 and an exhaust 52, and includes a turbomachinery flowpath 54 extending between the inlet 50 and the exhaust 52. The inlet 50 is for the embodiment shown an annular or axisymmetric 360 degree inlet 50 located between the rotor blade assembly 12 and the fixed or stationary vane assembly 18, and provides a path for incoming atmospheric air to enter the turbomachinery flowpath 54 (and compressors 44, 34, combustion section 40, and turbines 36, 42) inwardly of the guide vanes 28 along the radial direction R. Such a location may be advantageous for a variety of reasons, including management of icing performance as well as protecting the inlet 50 from various objects and materials as may be encountered in operation.

However, in other embodiments, the inlet 50 may be positioned at any other suitable location, e.g., aft of the vane assembly 18, arranged in a non-axisymmetric manner, etc.

As is depicted, the rotor assembly 12 is driven by the turbomachine 30, and more specifically, is driven by the low speed spool 54. More specifically, still, engine 10 in the embodiment shown in FIG. 1 includes a power gearbox 56, and the rotor assembly 12 is driven by the low speed spool 54 of the turbomachine 30 across the power gearbox 56. In such a manner, the rotating rotor blades 16 of the rotor assembly 12 may rotate around the axis 14 and generate thrust to propel engine 10, and hence an aircraft to which it is associated, in a forward direction F.

The power gearbox 56 may include a gearset for decreasing a rotational speed of the low speed spool 54 relative to the low speed turbine 42, such that the rotor assembly 12 may rotate at a slower rotational speed than the low speed spool 54.

As briefly mentioned above the engine 10 includes a vane assembly 18. The vane assembly 18 extends from the cowl 48 and is positioned aft of the rotor assembly 12. The vanes 20 of the vane assembly 18 may be mounted to a stationary frame or other mounting structure and do not rotate relative to the central axis 14. For reference purposes, FIG. 1 also depicts the forward direction with arrow F, which in turn defines the forward and aft portions of the system. As shown in FIG. 1, the rotor assembly 12 is located forward of the turbomachine 30 in a "puller" configuration, and the exhaust 52 is located aft of the guide vanes 28. As will be appreciated, the vanes 20 of the vane assembly 18 may be configured for straightening out an airflow (e.g., reducing a swirl in the airflow) from the rotor assembly 12 to increase an efficiency of the engine 10. For example, the vanes 20 may be sized, shaped, and configured to impart a counteracting swirl to the airflow from the rotor blades 16 so that in a downstream direction aft of both rows of airfoils (e.g., blades 16, vanes 20) the airflow has a greatly reduced degree of swirl, which may translate to an increased level of induced efficiency.

Referring still to FIG. 1, it may be desirable that the rotor blades 16, the vanes 20, or both, incorporate a pitch change mechanism such that the airfoils (e.g., blades 16, vanes 20, etc.) can be rotated with respect to an axis of pitch rotation either independently or in conjunction with one another. Such pitch change can be utilized to vary thrust and/or swirl effects under various operating conditions, including to adjust a magnitude or direction of thrust produced at the rotor blades 16, or to provide a thrust reversing feature which may be useful in certain operating conditions such as upon landing an aircraft, or to desirably adjust acoustic noise produced at least in part by the rotor blades 16, the vanes 20, or aerodynamic interactions from the rotor blades 16 relative to the vanes 20. More specifically, for the embodiment of FIG. 1, the rotor assembly 12 is depicted with a pitch change mechanism 58 for rotating the rotor blades 16 about their respective pitch axes 60, and the vane assembly 18 is depicted with a pitch change mechanism 62 for rotating the vanes 20 about their respective pitch axes 64.

It will be appreciated, however, that the exemplary single rotor unducted engine 10 depicted in FIG. 1 is by way of example only, and that in other exemplary embodiments, the engine 10 may have any other suitable configuration, including, for example, any other suitable number of shafts or spools, turbines, compressors, etc. Additionally, or alternatively, in other exemplary embodiments, any other suitable gas turbine engine may be provided. For example, in other exemplary embodiments, the gas turbine engine may be a ducted turbofan engine, a turboshaft engine, a turboprop engine, turbojet engine, etc. Moreover, for example, although the engine is depicted as a single unducted rotor engine, in other embodiments, the engine may include a multi-stage open rotor configuration, and aspects of the disclosure described hereinbelow may be incorporated therein.

Figure 2:
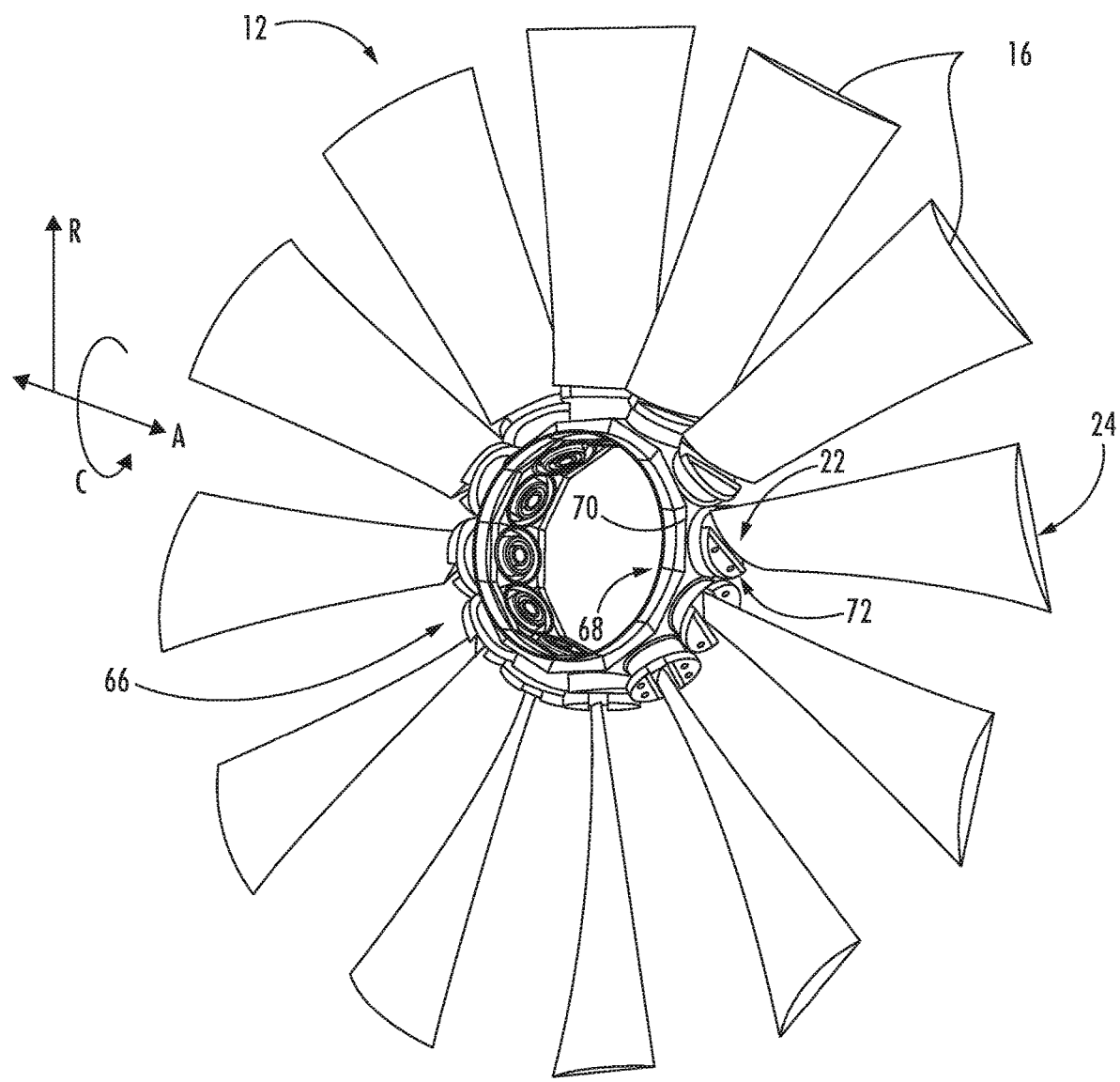
FIG. 2 is a perspective view of a rotor assembly in accordance with an aspect of the present disclosure.
Figure 3:
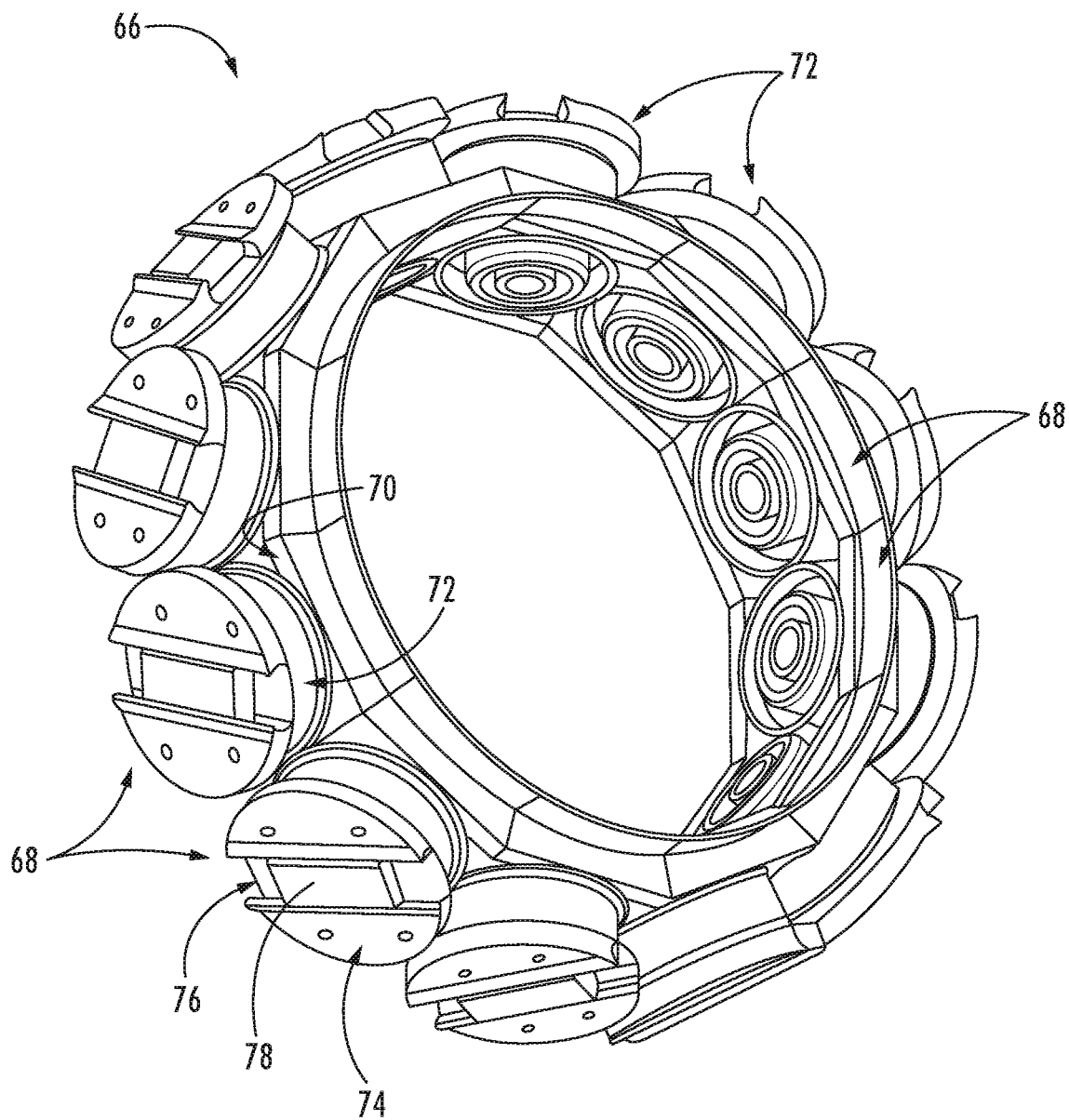
FIG. 3 is a perspective view of a rotor disk of the exemplary rotor assembly of FIG. 2 in accordance with an exemplary embodiment of the present disclosure.

Referring now to FIGS. 2 and 3, perspective views of all or aspects of a rotor assembly 12 in accordance with an exemplary aspect of the present disclosure are provided. Specifically, FIG. 2 provides a perspective view of the exemplary rotor assembly 12, and FIG. 3 provides a perspective view of a disk 66 of the rotor assembly is depicted with most of the rotor blades 16 of the rotor assembly 12 removed. In certain exemplary aspects, the rotor assembly 12 of FIGS. 2 and 3 may be incorporated into the engine 10 described above with respect to FIG. 1.

As is depicted, the exemplary rotor assembly 12 generally includes the plurality of rotor blades 16 and a disk 66 for mounting the plurality of rotor blades 16. For the exemplary embodiment depicted, the rotor assembly 12 includes twelve (12) rotor blades 16. However, in one suitable embodiment, the rotor assembly 12 may have at least eight (8) rotor blades 16. In another suitable embodiment, the rotor assembly 12 may have at least twelve (12) rotor blades 16. In yet another suitable embodiment, the rotor assembly 12 may have at least fifteen (15) rotor blades 16. In yet another suitable embodiment, the rotor assembly 12 may have at least eighteen (18) rotor blades 16. In still other embodiments, the rotor assembly 12 may have any other suitable number of rotor blades 16, such as less than eight or more than 18.

Additionally, the disk 66 includes a plurality of disk segments 68 that are rigidly coupled together or integrally molded together in a generally annular shape (e.g., a polygonal shape). The shape may be annular with flat portions 70 for receiving a respective mount for an airfoil, or rather a trunnion mechanism 72 for a rotor blade 16 in the embodiment shown. The flat portions 70 are adjacent and may be abutting.

More specifically, as is shown more clearly in FIG. 3, each disk segment 68 includes a mount, with each mount coupled to a root end 22 of a respective rotor blade 16 for mounting the rotor blade 16 within an airflow. In particular, for the embodiment shown, the mounts are configured as the trunnion mechanisms 72 of the disk segments 68. It will be appreciated that the disk 66 may facilitate operation of a pitch change mechanism 58. In particular, the disk 66 may trunnion mechanism 72 may allow for the rotor blades 16 to be mounted to the disk 66, while rotating the rotor blades 16 about their respective pitch axes 60. In such a manner, it will be appreciated that each rotor blade 16 is coupled to one of the disk segments 68 at a respective trunnion mechanism 72 that facilitates retaining its associated rotor blade 16 on the disk 66 during rotation of disk 66 (i.e., trunnion mechanism 72 facilitates providing a load path to disk 66 for the centrifugal load generated by rotor blades 16 during rotation about engine centerline axis 14), while still rendering its associated rotor blade 16 rotatable relative to disk 66 about pitch axis 60.

In such a manner, it will be appreciated that the mounts of the disk 66, or rather the disk segments 68, include an outer surface along the radial direction R exposed to the airflow over the rotor blades 16 mounted thereto during operation. For the embodiment shown, the outer surface is an outer surface 74 of the trunnion mechanism 72 of the respective disk segment 68. The outer surface 74 further defines a mounting geometry for receiving a correspondingly shaped portion of the rotor blades 16. The mounting geometry in the embodiment shown is a dovetail slot 76. A corresponding dovetail 78 at the root end 22 of each respective rotor blade 16 may be received within the respective dovetail slot 76 to mount the rotor blade 16 to the rotor disk 66, and specifically to the trunnion mechanism 72.

It will be appreciated that although for the embodiment shown the rotor blades 16 are each mounted to the rotor disk 66 through a dovetail connection with a respective trunnion mechanism 72, in other embodiments, the trunnion mechanism 72 may be coupled to the rotor blade 16 in any other suitable manner, or the trunnion mechanism 72 (or other mount) may be formed integrally with the rotor blade 16 as, e.g., a spar attachment. In such a manner the mount may be formed integrally with the root end 22 of the airfoil/rotor blade 16.

Referring now to FIG. 4, a schematic view is provided of a mount 100 configured to be coupled to a root end of an airfoil for mounting the airfoil within an airflow. In certain exemplary embodiments, the mount 100 may be configured as, e.g., a trunnion mechanism of a disk segment of a disk, such as the trunnion mechanism 72 of the disk segment 68 of the disk 66 described above with respect to FIGS. 2 and 3. In other embodiments, the mount 100 may be configured as any suitable collet for mounting an airfoil, or other mounting structure (such as a mounting structure formed integrally with a root end of an airfoil in, e.g., a spar connection configuration).

More specifically, for the embodiment depicted in FIG. 4, the exemplary mount 100 depicted is configured to mount a variable pitch airfoil configured to be rotated about a pitch axis by a pitch change mechanism. In such a manner, the mount 100 may also be configured to rotate about an axis 102, which in certain exemplary aspects may be aligned with the pitch axis of the airfoil. For example, in certain embodiments, the exemplary mount 100 depicted in FIG. 4 may be used to mount 100, e.g., a rotor blade 16 of a rotor assembly 12 within an airflow path over the rotor assembly 12. In such a case, the mount 100 may allow the rotor blade 16 to rotate about its pitch axis 60, driven by a pitch change mechanism 58 (see FIG. 1).

It will be appreciated, however, that in other exemplary embodiments, the mount 100 may additionally or alternatively be used to mount any other suitable airfoil, such as an outlet guide vane 20 of a guide vane assembly 18, particularly if the outlet guide vanes 20 are variable pitch outlet guide vanes (as in the embodiment of FIG. 1).

Referring still to FIG. 4, the mount 100 further includes an outer surface 104 along the radial direction R and an inner surface 106 along the radial direction R. The airfoil may be mounted to the mount 100 at the radially outer surface 104. Particularly for the embodiment shown, the mount 100 defines a dovetail slot 108 through the outer surface 104 for receiving a correspondingly shaped dovetail of an airfoil.

For the embodiments utilizing a pitch change mechanism, it will be appreciated that a temperature of the mount 100 may be increased through operation of the pitch change mechanism. Other structures and systems inward of the mount 100 may similarly increase a temperature of the mount 100 (such as bearing systems, etc.). Accordingly, in order to ensure the mount 100 is maintained within a desired operating temperature range, the mount 100 includes one or more thermal management features for reducing a temperature of the mount 100 during operation of the engine 10.

Specifically, for the embodiment shown, the mount 100 includes one or more air-cooling features, and more specifically, includes at least one air-cooling channel 110 extending through the mount 100, and more specifically still includes a plurality of air-cooling channels 110 extending through the mount 100. Referring now briefly also to FIG. 5, providing a cross-sectional view along Line 5-5 in FIG. 4, the air-cooling channels 110 extend between an inlet 112 and an outlet 114. For the embodiment shown, the inlet 112 and outlet 114 are each defined in the outer surface 104.

In operation, an airflow over the mount 100, such as an ambient airflow, may flow into the inlet 112 and through a respective channel 436 and subsequently out the outlet 114. Notably, the airflow may be the same airflow in which the airfoil coupled to the mount 100 is positioned, such as an airflow across the rotor assembly 12 (see FIG. 1), an airflow across the outlet guide vane assembly 18, etc. The airflow may accept heat from the mount 100 by virtue of such a flow pattern, reducing a temperature of the mount 100.

Referring now particularly to FIG. 6, providing a close-up view of an inlet 112 to an air-cooling channel 110 as indicated at Circle 6 in FIG. 4, the mount 100 may further include one or more features for increasing an airflow 116 into the air-cooling channels 110. Specifically, the embodiment depicted includes a scoop 118 mounted to the radially outer surface 104 of the mount 100 for directing the airflow 116 into the inlet 112 and through the channel 110. In the embodiment of FIG. 6, the scoop 118 is positioned at least partially at a downstream end of the inlet 112 and extends at least partially over the inlet 112 (as viewed along the radial direction R).

It will be appreciated that in other embodiments any other suitable feature may additionally or alternatively be provided for inducing an airflow through the channels 110, such as an indentation at an upstream side of the inlet 112, a pressure drop feature at the outlet 114, etc. Alternatively, no features may be provided for increasing the airflow through the channels 436.

It will further be appreciated that although two air-cooling channels 110 are depicted, in other embodiments, the mount 100 may include any other suitable number of air-cooling channels 110 (e.g., 1, 3, 4, 5, 6, etc.). Additionally, it will be appreciated that in other exemplary embodiments, the air-cooling channels 110 may have any suitable shape, may merge into one another and, e.g., share outlets 114, may split into multiple channels 110 having multiple outlets 114, may define any suitable linear or nonlinear shape (such as a serpentine path), etc.

Figure 7:
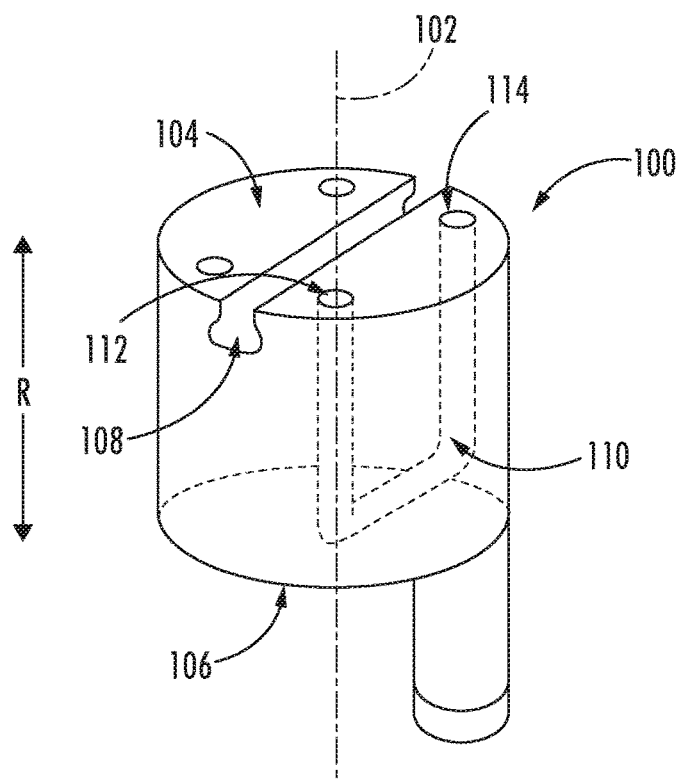
FIG. 7 is a schematic view of a mount for an airfoil in accordance with another exemplary embodiment of the present disclosure.
Figure 8:
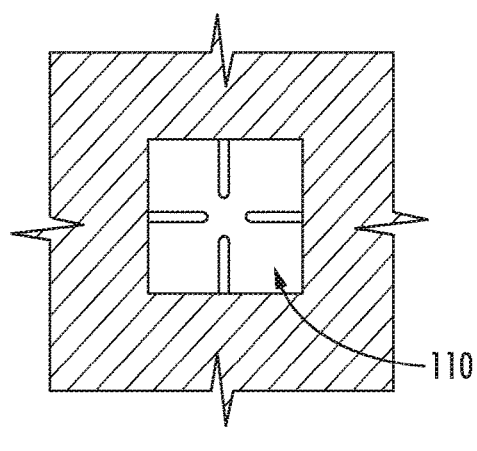
FIG. 8 is a cross-sectional view of a mount for an airfoil in accordance yet with another exemplary embodiment of the present disclosure.
Figure 9:
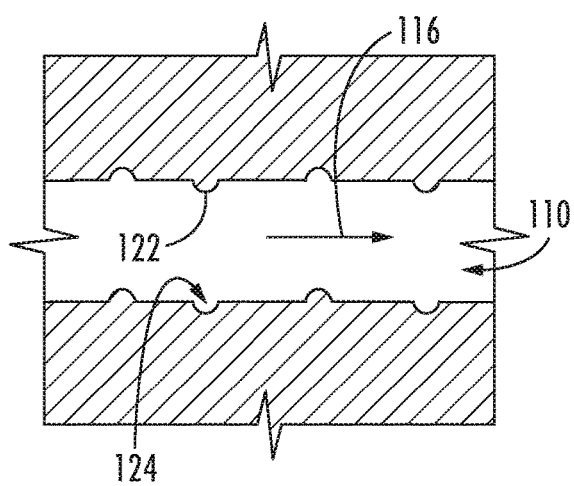
FIG. 9 is a cross-sectional view of a mount for an airfoil in accordance still with another exemplary embodiment of the present disclosure.

Further, referring generally to FIGS. 7 through 9, various alternative exemplary embodiments are depicted of a mount 100 in accordance with the present disclosure. With respect to FIG. 7, it will be appreciated that although the air-cooling channels 110 are depicted in FIG. 4 extending relatively shallow into a radial depth of the mount 100, in other exemplary embodiments, one or more of the air-cooling channels 110 may extend at least half-way through a depth of the mount 100 (between the outer surface and inner surface), at least 75% of the depth through the mount 100, or at least 90% of the depth through the mount 100. In such a manner, the air-cooling channels 110 be more effectively remove heat from throughout the mount 100. Further, still, in certain exemplary embodiments, the mount 100 may include one or more heat transfer features extending into the channel(s) 110 or defining in part the channel(s) 110. For example, referring to FIG. 8 (providing similar cross-sectional view as shown in FIG. 5), in certain embodiments, the mount 100 may include one or more fins 120 or other protrusions extending into the channel(s) 110 for increasing a heat transfer between the mount 100 and the airflow through the channel(s) 110. Additionally or alternatively, referring to FIG. 9 (providing cross-sectional view of a channel 110 along a length of the channel 110), the mount 100 may include one or more turbulators 122 or define one or more dimples for creating turbulence in the airflow 116 through the channel(s) 110 to increase a heat transfer between the mount 100 and the airflow through the channel(s) 110.

Further, it will be appreciated that in at least certain exemplary aspects, the designs depicted in FIGS. 4 through 9 and described herein may be enabled by utilizing an additive manufacturing process, such as one or more of the additive manufacturing processes described elsewhere herein.

Further aspects of the invention are provided by the subject matter of the following clauses:

A gas turbine engine defining a radial direction, the engine comprising: an airfoil positioned within an airflow and extending between a root end and a tip along the radial direction; and a mount coupled to or formed integrally with the root end of the airfoil for mounting the airfoil to the engine, the mount comprising an outer surface along the radial direction exposed to the airflow and defining an air-cooling channel extending between an inlet and an outlet, the inlet positioned on the outer surface of the mount.

The engine of one or more of these clauses, wherein the outlet of the air-cooling channel is also positioned on the outer surface of the mount.

The engine of one or more of these clauses, wherein the mount further comprises a scoop configured to direct an airflow into the inlet of the channel.

The engine of one or more of these clauses, wherein the scoop is positioned at least partially at a downstream end of the inlet and extends at least partially over the inlet.

The engine of one or more of these clauses, wherein the air-cooling channel defined by the mount is a first air-cooling channel of a plurality of air-cooling channels defined by the mount.

The engine of one or more of these clauses, wherein the air-cooling channel defines a non-uniform geometry along a length thereof.

The engine of one or more of these clauses, wherein the mount is formed through an additive manufacturing process.

The engine of one or more of these clauses, wherein the outer surface of the mount defines an airfoil slot for receiving the root end of the airfoil, and wherein the air-cooling channel extends generally parallel to the airfoil slot.

The engine of one or more of these clauses, wherein the outer surface of the mount defines an airfoil slot for receiving the root end of the airfoil, wherein the air-cooling channel defined by the mount is a first air-cooling channel, wherein the mount further defines a second air-cooling channel extending from an inlet positioned on the outer surface of the mount, and wherein the inlet of the first air-cooling channel is positioned opposite the airfoil slot from the inlet of the second air-cooling channel.

The engine of one or more of these clauses, wherein the gas turbine engine is a single unducted rotor engine.

The engine of one or more of these clauses, wherein the airfoil is an unducted fan blade of an unducted fan of the single unducted rotor engine.

The engine of one or more of these clauses, further comprising: a stage of unducted guide vanes positioned downstream of the unducted fan.

The engine of one or more of these clauses, wherein the stage of unducted guide vanes includes between five and thirty guide vanes.

The engine of one or more of these clauses, wherein the unducted fan includes between three and twenty unducted fan blades.

A mount for coupling to a root end of an airfoil of a gas turbine engine to mount the airfoil within an airflow of the gas turbine engine, the mount comprising: a body, the body of the mount comprising an outer surface along a radial direction configured to be exposed to the airflow of the gas turbine engine, the body of the mount defining an air-cooling channel extending between an inlet and an outlet, the inlet positioned on the outer surface of the mount.

The mount of one or more of these clauses, wherein the outlet of the air-cooling channel is also positioned on the outer surface of the mount.

The mount of one or more of these clauses, wherein the mount further comprises a scoop configured to direct an airflow into the inlet of the channel.

The mount of one or more of these clauses, wherein the air-cooling channel defined by the mount is a first air-cooling channel of a plurality of air-cooling channels defined by the mount.

The mount of one or more of these clauses, wherein the air-cooling channel defines a non-uniform geometry along a length thereof.

The mount of one or more of these clauses, wherein the mount is formed through an additive manufacturing process.

What is claimed is:

1. A gas turbine engine defining a radial direction, the engine comprising:
    an airfoil positioned within an airflow and extending between a root end and a tip along the radial direction; and
    a mount coupled to or formed integrally with the root end of the airfoil for mounting the airfoil to the engine, the mount comprising an outer surface along the radial direction exposed to the airflow and defining an air-cooling channel extending between an inlet and an outlet, the inlet positioned on the outer surface of the mount.

2. The engine of claim 1, wherein the outlet of the air-cooling channel is also positioned on the outer surface of the mount.

3. The engine of claim 1, wherein the mount further comprises a scoop configured to direct an airflow into the inlet of the channel.

4. The engine of claim 3, wherein the scoop is positioned at least partially at a downstream end of the inlet and extends at least partially over the inlet.

5. The engine of claim 1, wherein the air-cooling channel defined by the mount is a first air-cooling channel of a plurality of air-cooling channels defined by the mount.

6. The engine of claim 1, wherein the air-cooling channel defines a non-uniform geometry along a length thereof.

7. The engine of claim 1, wherein the mount is formed through an additive manufacturing process.

8. The engine of claim 1, wherein the outer surface of the mount defines an airfoil slot for receiving the root end of the airfoil, and wherein the air-cooling channel extends generally parallel to the airfoil slot.

9. The engine of claim 1, wherein the outer surface of the mount defines an airfoil slot for receiving the root end of the airfoil, wherein the air-cooling channel defined by the mount is a first air-cooling channel, wherein the mount further defines a second air-cooling channel extending from an inlet positioned on the outer surface of the mount, and wherein the inlet of the first air-cooling channel is positioned opposite the airfoil slot from the inlet of the second air-cooling channel.

10. The engine of claim 1, wherein the gas turbine engine is a single unducted rotor engine.

11. The engine of claim 10, wherein the airfoil is an unducted fan blade of an unducted fan of the single unducted rotor engine.

12. The engine of claim 11, further comprising:
    a stage of unducted guide vanes positioned downstream of the unducted fan.

13. The engine of claim 12, wherein the stage of unducted guide vanes includes between five and thirty guide vanes.

14. The engine of claim 11, wherein the unducted fan includes between three and twenty unducted fan blades.

15. A mount for coupling to a root end of an airfoil of a gas turbine engine to mount the airfoil within an airflow of the gas turbine engine, the mount comprising:
    a body, the body of the mount comprising an outer surface along a radial direction configured to be exposed to the airflow of the gas turbine engine, the body of the mount defining an air-cooling channel extending between an inlet and an outlet, the inlet positioned on the outer surface of the mount.

16. The mount of claim 15, wherein the outlet of the air-cooling channel is also positioned on the outer surface of the mount.

17. The mount of claim 15, wherein the mount further comprises a scoop configured to direct an airflow into the inlet of the channel.

18. The mount of claim 15, wherein the air-cooling channel defined by the mount is a first air-cooling channel of a plurality of air-cooling channels defined by the mount.

19. The mount of claim 15, wherein the air-cooling channel defines a non-uniform geometry along a length thereof.

20. The mount of claim 15, wherein the mount is formed through an additive manufacturing process.

* * * * *